(12) United States Patent
Hsieh et al.

(10) Patent No.: US 10,236,565 B2
(45) Date of Patent: Mar. 19, 2019

(54) WEARABLE ELECTRONIC DEVICE

(71) Applicant: ASUSTeK COMPUTER INC., Taipei (TW)

(72) Inventors: Yi-Ting Hsieh, Taipei (TW); Saou-Wen Su, Taipei (TW); Cheng-Tse Lee, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 15/828,589

(22) Filed: Dec. 1, 2017

(65) Prior Publication Data

US 2018/0175486 A1 Jun. 21, 2018

(30) Foreign Application Priority Data

Dec. 16, 2016 (TW) .............................. 105219242 U (51) Int. Cl.
| | |
|---|---|
| *H01Q 1/27* | (2006.01) |
| *H04N 5/64* | (2006.01) |
| *H01Q 1/22* | (2006.01) |
| *H01Q 21/28* | (2006.01) |
| *H01Q 7/00* | (2006.01) |
| *G04G 21/04* | (2013.01) |
| *H01Q 1/48* | (2006.01) |

(52) U.S. Cl.
CPC ............. *H01Q 1/273* (2013.01); *G04G 21/04* (2013.01); *H01Q 1/22* (2013.01); *H01Q 1/48* (2013.01); *H01Q 7/005* (2013.01); *H01Q 21/28* (2013.01); *H04N 5/64* (2013.01)

(58) Field of Classification Search
CPC ............. H01Q 1/22; H01Q 1/44; H01Q 1/273; G04G 21/04; G06F 1/163; A61B 5/681

USPC .......................................................... 343/718
See application file for complete search history.

(56) References Cited

U.S. PATENT DOCUMENTS

| | | | |
|---|---|---|---|
| 2016/0062417 A1* | 3/2016 | Chu ...................... | G06F 1/1698 600/390 |
| 2016/0187857 A1* | 6/2016 | Cho ...................... | G04R 20/00 368/47 |
| 2017/0179580 A1* | 6/2017 | Park ......................... | H01Q 5/30 |

FOREIGN PATENT DOCUMENTS

| | | |
|---|---|---|
| CN | 204596942 U | 8/2015 |
| CN | 205375019 U | 7/2016 |
| EP | 1612884 B1 | 10/2008 |

(Continued)

*Primary Examiner* — Dameon E Levi
*Assistant Examiner* — Hasan Z Islam
(74) *Attorney, Agent, or Firm* — McClure, Qualey & Rodack, LLP (57) ABSTRACT

A wearable electronic device includes a device body, a wearable body, a circuit board, an antenna system and a conductive extension portion. The device body includes an upper casing and a lower casing. A feeding portion, a first grounding portion and a second grounding portion are disposed on a periphery of the circuit board. The second grounding portion is electrically connected to the upper casing. The antenna system is disposed on the inner surface of the lower casing. The feeding terminal of the antenna system is electrically connected to the feeding portion of the circuit board. The grounding terminal of the antenna system is electrically connected to the first grounding portion of the circuit board. An end of the conductive extension portion is electrically connected to the upper casing, the other end of the conductive extension portion is extended into the wearable body.

10 Claims, 7 Drawing Sheets

(56) References Cited

FOREIGN PATENT DOCUMENTS

TW          I316368 B    10/2009
TW          I360915 B     3/2012

\* cited by examiner

WEARABLE ELECTRONIC DEVICE

CROSS-REFERENCE TO RELATED APPLICATION

This application claims the priority benefit of TW application serial No. 105219242, filed on Dec. 16, 2016. The entirety of the above-mentioned patent application is hereby incorporated by references herein and made a part of specification.

BACKGROUND OF THE INVENTION

Field of the Invention

The disclosure relates to a wearable electronic device.

Description of the Related Art

With a development of wireless communication technology, the communication by wireless communication transmission is now in a high efficiency such as voice communication and data exchange. In addition, the dimension of a wireless communication device trends to be smaller and thinner and is easy to be integrated into an electronic device as a wearable electronic device.

A wearable electronic device is often small to fit on human body more comfortable. For example, the width of a watch is better to be equal to a width of a human wrist. As a result, an antenna, especially a LTE antenna with a long wavelength within a large size, is difficult to be integrated to a wearable electronic device. Moreover, a casing of such wearable electronic device is often made of metal which affects the wireless signal transmission quality due to a shielding effect. Then, the communication ability is limited.

BRIEF SUMMARY OF THE INVENTION

According to a first aspect, a wearable electronic device is provided. The wearable electronic device comprising: a device body including an upper casing and a lower casing, the upper casing is made of conductive material, the lower casing includes an inner surface; a wearable body connected to the device body; a circuit board disposed between the upper casing and the lower casing, a feeding portion, a first grounding portion and a second grounding portion are disposed on a periphery of the circuit board, the second grounding portion is electrically connected to the upper casing; an antenna system disposed on the inner surface of the lower casing, the antenna system includes a feeding terminal and a grounding terminal, the feeding terminal is electrically connected to the feeding portion of the circuit board, the grounding terminal is electrically connected to the first grounding portion of the circuit board; and a conductive extension portion, an end of the conductive extension portion is electrically connected to the upper casing, the other end of the conductive extension portion is extended into the wearable body.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
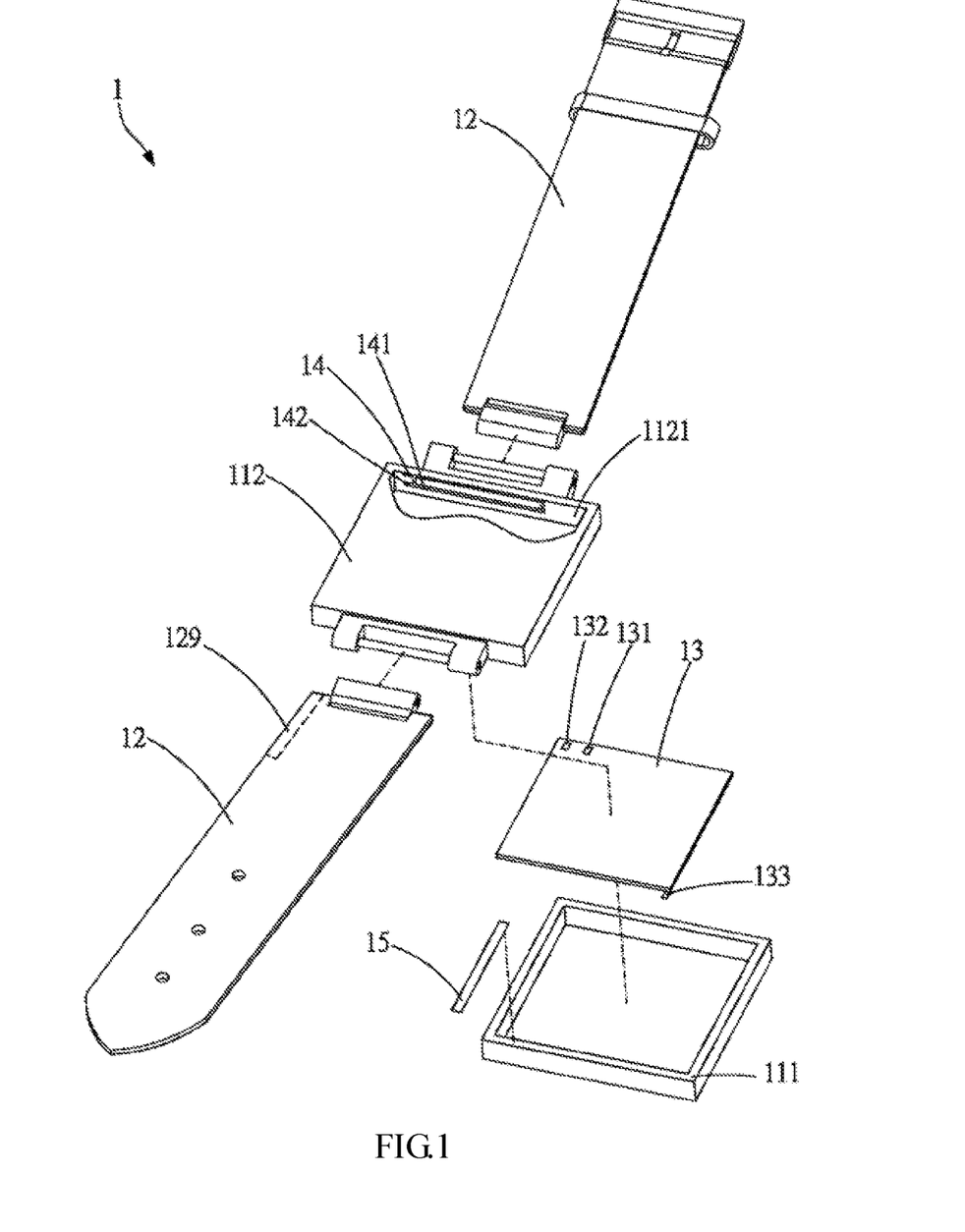
FIG. 1 is an exploded diagram showing a wearable electronic device in an embodiment.
Figure 2:
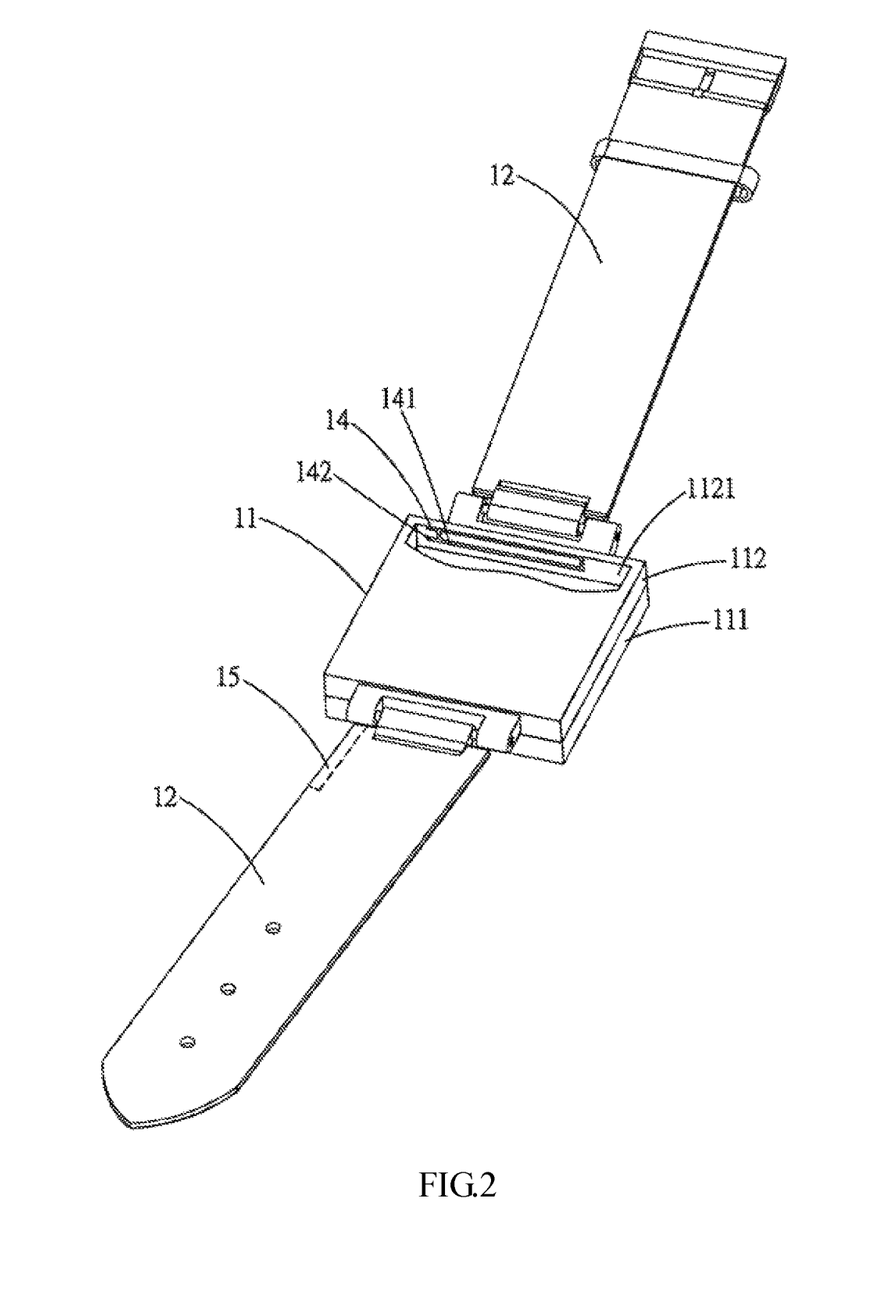
FIG. 2 is a schematic diagram showing a wearable electronic device in an embodiment.

Please refer to FIG. 1 and FIG. 2. FIG. 1 is an exploded diagram showing a wearable electronic device in an embodiment. FIG. 2 is a schematic diagram showing a wearable electronic device in an embodiment. In an embodiment, a wearable electronic device 1 (such as a smart watch) includes a device body 11, a wearable body 12, a circuit board 13, an antenna system 14 and a conductive extension portion 15. The device body 11 includes an upper casing 111 made of a conductive material and a lower casing 112 made of a nonconductive material. In an embodiment, the conductive material is a metal. Part of the lower casing 112 in FIG. 1 and FIG. 2 is perspective to expose the antenna system 14 for better description. In an embodiment, the lower casing 112 includes an inner surface 1121. The wearable body 12 is connected to the device body 11. The wearable body 12 is with a structure and an appearance similar to a watch band. The circuit board 13 is disposed between the upper casing 111 and the lower casing 112. A feeding portion 131, a first grounding portion 132 and a second grounding portion 133 are disposed on a periphery of the circuit board 13. The second grounding portion 133 is electrically connected to the upper casing 111 made of a metal. The antenna system 14 is disposed on the inner surface 1121 of the lower casing 112. The antenna system 14 includes a feeding terminal 141 and a grounding terminal 142. The feeding terminal 141 of the antenna system 14 is electrically connected to the feeding portion 131 of the circuit board 13. The grounding terminal 142 of the antenna system 14 is electrically connected to the first grounding portion 132 of the circuit board 13. An end of the conductive extension portion 15 is electrically connected to the upper casing 111. The other end of the conductive extension portion 15 is extended into a slot 129 of the wearable body 12. In an embodiment, the material of the conductive extension portion 15 is a metal.

In an embodiment, the antenna system 14 is completely disposed in the device body 11 of the wearable electronic device 1 but not extending into the wearable body 12. Then, the electrical connection between the circuit board 13 and the antenna system 14 would not be affected when the wearable body 12 and the device body 11 have relative movement between each other or when the wearable body 12 and the device body 11 are detached from each other. Moreover, in an embodiment, the second grounding portion 133 of the circuit board 13 is electrically connected with the upper casing 111. The conductive extension portion 15 is directly electrically connected with the upper casing 111. That is, the ground of the circuit board 13 is electrically connected to upper casing 111 and the conductive extension portion 15. Then, a length of a current path is controlled by changing a length or width of the conductive extension portion 15 or changing a connecting position of the second grounding portion 133 of the circuit board 13 and the upper casing 111. As a result, a resonant frequency of the antenna system 14 is changed. In an embodiment, the antenna system 14 is operating in a first frequency band (such as LTE Band 4, 1710-2155 MHz) and a second frequency band (such as LTE Band 13, 746-787 MHz). The length of the current path of the antenna system 14 in the circuit board 13 is changed by changing the length or width of the conductive extension portion 15 or changing the connection position between the second grounding portion 133 and the upper casing 111. Then, the antenna system 14 is operating in a required frequency band. As a result, the wearable electronic device 1 is able to receive and send a 2/3/4G signal itself, without the need of a smart phone or another electronic device.

Figure 3A:
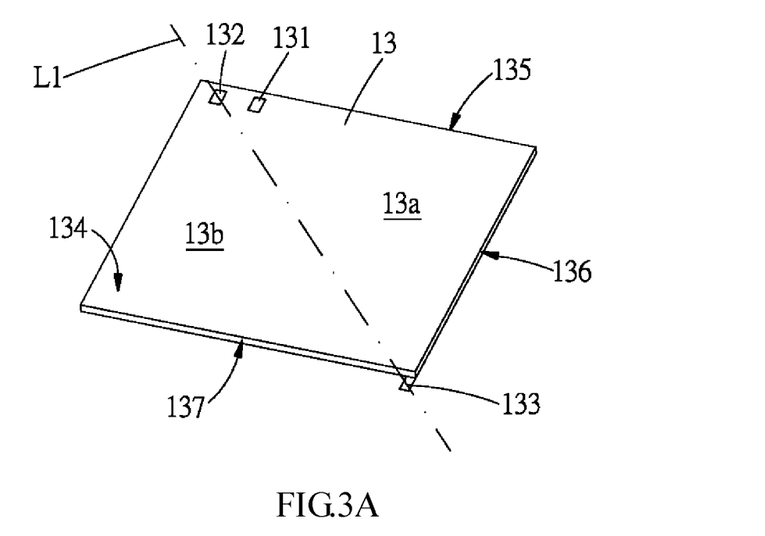
FIG. 3A is an enlarged view showing a circuit board of a wearable electronic device in an embodiment.
Figure 3B:
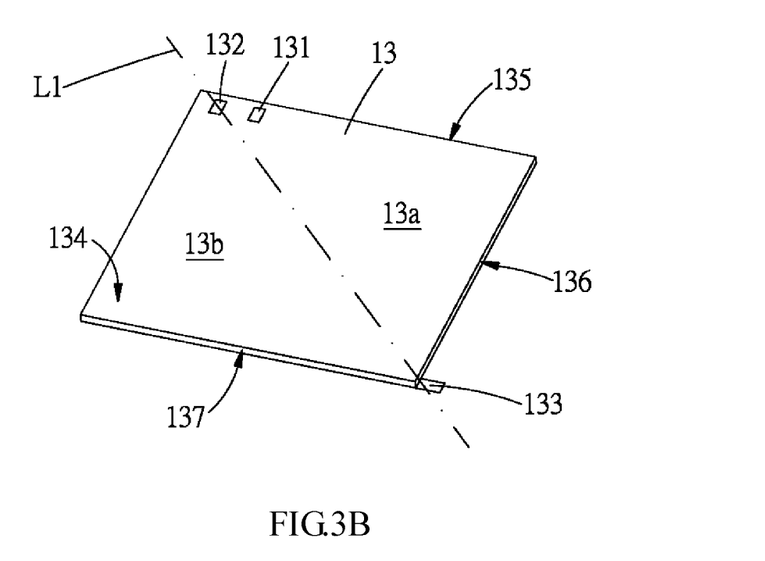
FIG. 3B is an enlarged view showing a circuit board of a wearable electronic device in an embodiment.
Figure 4:
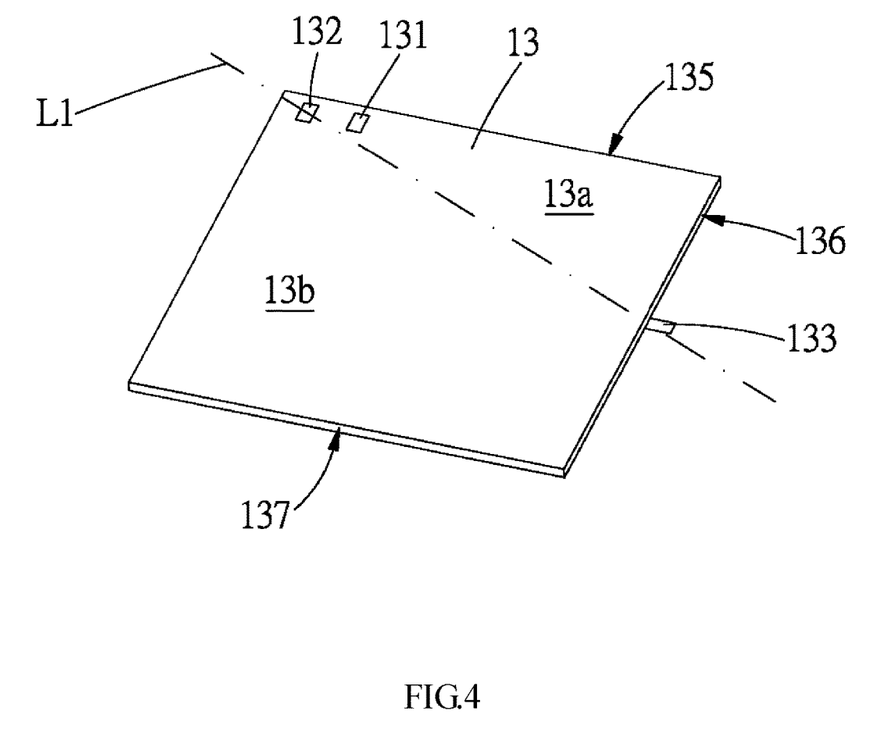
FIG. 4 is an enlarged view showing a circuit board of a wearable electronic device in an embodiment.

Please refer to FIG. 3A, FIG. 3B and FIG. 4. FIG. 3A, FIG. 3B and FIG. 4 are enlarged views showing a circuit board of a wearable electronic device in embodiments. In figures, the second grounding portion 133 of the circuit board 13 is located at different positions while the positions of the feeding portion 131 and the first grounding portion 132 are constant. A surface of the circuit board 13 is divided into a first part 13*a* and a second part 13*b* by a virtual line L1 passing through the first grounding portion 132 and the second grounding portion 133 of the circuit board 13. The ratio of an area of the first part 13*a* and the area of the second part 13*b* is in a range of 1:5 to 1:1. As shown in FIG. 3A, the area ratio between the first part 13*a* and the second part 13*b* is about 1:1. That is, the first grounding portion 132 and the second grounding portion 133 are adjacent to two ends of a diagonal of a surface 134 of the circuit board 13, respectively. The first grounding portion 132 and the second grounding portion 133 are disposed on the two opposite parallel edges 135, 137 of the circuit board 13, respectively. As shown in FIG. 3B, the area ratio of the first part 13*a* to the second part 13*b* is also about 1:1. In one embodiment, the first grounding portion 132 and the second grounding portion 133 are disposed on two adjacent edges 135, 136 of the circuit board 13, respectively. As shown in FIG. 4, when the area ratio of the first part 13*a* to the second part 13*b* is about 1:5. The first grounding portion 132 and the second grounding portion 133 are disposed on two adjacent edges 135, 136 of the circuit board 13, respectively. With the change of the area ratio of the first part 13*a* and the second part 13*b*, the current path of the antenna system 14 on the circuit board 13 is changed accordingly. When the area ratio of the first part 13*a* to the second part 13*b* is 1:1, the current path is largest.

Figure 5:
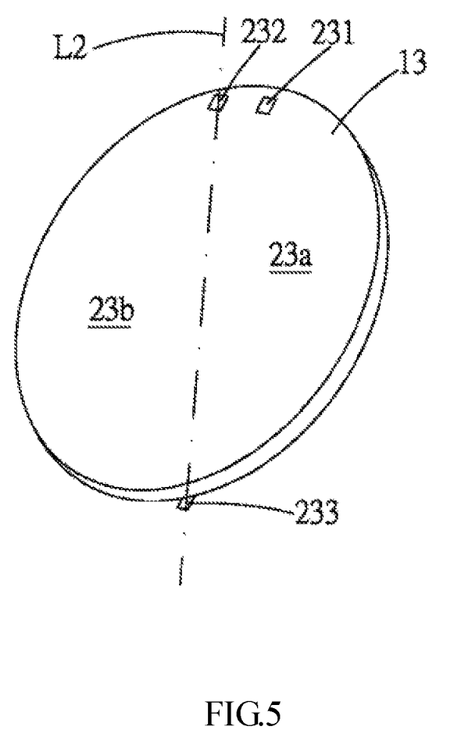
FIG. 5 is an enlarged view showing a circuit board of a wearable electronic device in an embodiment.
Figure 6:
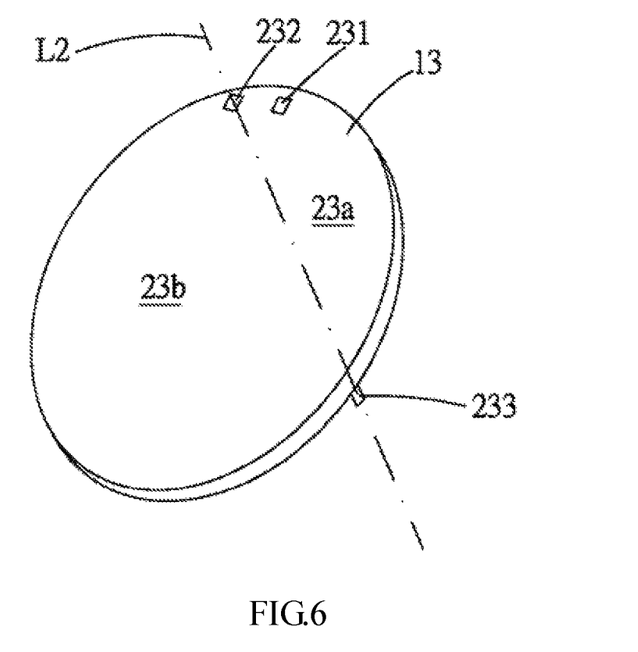
FIG. 6 is an enlarged view showing a circuit board of a wearable electronic device in an embodiment.

Please refer to FIG. 5 and FIG. 6. FIG. 5 and FIG. 6 are enlarged views showing a circuit board 13 of a wearable electronic device 1 in embodiments. The circuit board 23 in a circular shape is shown in FIG. 5 and FIG. 6. In the embodiments of FIG. 5 and FIG. 6, the second grounding portion 233 is located at different positions while the positions of the feeding portion 231 and the first grounding portion 232 are constant. The line L2 in the figures is a virtual line passing through the first grounding portion 232 and the second grounding portion 233 of the circuit board 23. Then, a surface of the circuit board 23 is divided into a first part 23*a* and a second part 23*b* by the line L2. As shown in FIG. 5, the area ratio of the first part 23*a* to the second part 23*b* is about 1:1. The second grounding portion 233 and the first grounding portion 232 are located on two ends of a diameter of the circuit board 23, respectively. As shown in FIG. 6, the area ratio of the first part 13*a* to the second part 13*b* is about 1:5. Compared to FIG. 5, the position of the second grounding portion 233 in FIG. 6 is closer to the position of the first grounding portion 232. Similarly, with the change of the area ratio of the first part 23*a* to the second part 23*b*, the current path of the antenna system 14 on the circuit board 13 is changed accordingly. When the area ratio of the first part 23*a* to the second part 23*b* is 1:1, the current path is the largest.

In an embodiment, the shape of the circuit board is an octagon shape or an oval shape, which depends on an exterior of the device body of the portable electronic device. However, no matter what the shape of the circuit board is, as mentioned above, when the virtual lines L1 (L2) passes through the first grounding portion 132 (232) and the second grounding portion 133 (233) of the circuit board 13 (23), the surface of the circuit board 13, 23 is divided into the first part 13*a* (23*a*) and the second part 13*b* (23*b*). The area ratio of the first part 13*a* (23*a*) to the second part 13*b* (23*b*) is in a range of 1:5 to 1:1.

Figure 7:
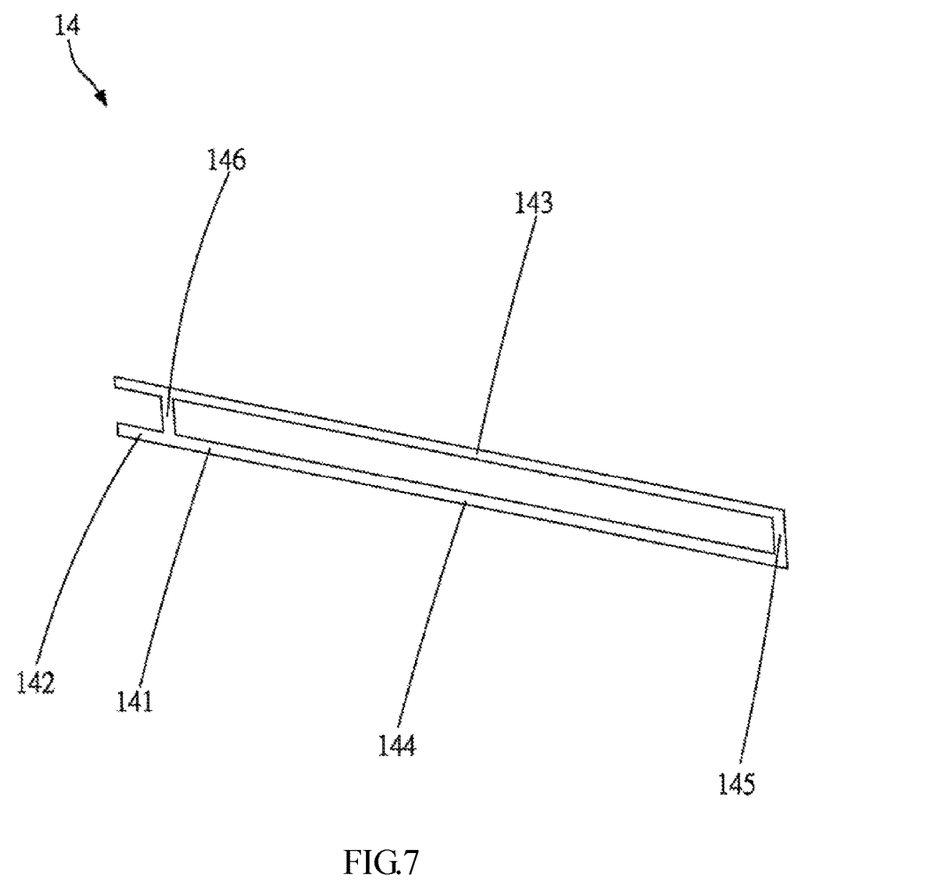
FIG. 7 is an enlarged view showing an antenna system of a wearable electronic device in an embodiment.

Please refer to FIG. 7. FIG. 7 is an enlarged view showing an antenna system of a wearable electronic device in an embodiment. In the embodiment, an antenna system 14 includes a feeding terminal 141, a grounding terminal 142, a first section 143, a second section 144, a third section 145 and s fourth section 146. The first section 143 and the second section 144 are longer than the third section 145 and the fourth section 146. The first section 143 is parallel to the second section 144. The first section 143 has a same length with that of the second section 144. Two ends of the third section 145 are connected to an end of the first section 143 and an end of the second section 144, respectively. An end of the fourth section 146 is connected between the two ends of the first section 143, and the other end of the fourth section 146 is connected between the two ends of the second section 144. In an embodiment, a resonant frequency ratio of the low and high frequency of the antenna system 14 is changed by changing the connection position between the fourth section 146, and the first section 143 and the second section 144. In an embodiment, the antenna system 14 is operating in a first frequency band (high frequency, such as LTE Band 4, 1710-2155 MHz) and a second frequency band (low frequency, such as LTE Band 13, 746-787 MHz).

In an embodiment, the material of the lower casing 112 is a laser direct structuring material. The antenna system 14 is directly formed on the inner surface 1121 of the lower casing 112 via laser direct structuring (LDS). A common laser direct structuring material is a modified plastic containing an organometallic compound. When placed in a specific wavelength of laser irradiation, the organometallic compound is activated and releases metal atoms due to a photoelectric coupling effect. As a result, the metal is plated on a part which is already activated by laser via the chemical plating. Then, the antenna formed on the lower casing with a curved surface structure by LDS is adapted to be used in a limited space of the wearable electronic device flexibly.

In an embodiment, the wearable body 12 is a two-piece watch band as shown in FIG. 1 and FIG. 2. The wearable body 12 is connected to two opposite side edges of the device body 11, respectively. Two pieces of the wearable body 12 are connected together when the wearable body 12 is worn on hand. In an embodiment, the wearable body 12 is a single piece band (for example, made of a plastic material or silicone material). One end of the wearable body 12 is fixed to a side of the device body 11. When the wearable body 12 is worn on hand, the end of the wearable body 12 is connected with the other side of the device body 11.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A wearable electronic device comprising,
a device body including an upper casing and a lower casing, the upper casing is made of a conductive material, the lower casing includes an inner surface;
a wearable body connected to the device body;
a circuit board disposed between the upper casing and the lower casing, wherein a feeding portion, a first grounding portion and a second grounding portion are disposed on a periphery of the circuit board, and the second grounding portion is electrically connected to the upper casing;
an antenna system disposed on the inner surface of the lower casing, wherein the antenna system includes a feeding terminal and a grounding terminal, the feeding terminal is electrically connected to the feeding portion of the circuit board, the grounding terminal is electrically connected to the first grounding portion of the circuit board; and
a conductive extension portion, an end of the conductive extension portion is electrically connected with the upper casing, the other end of the conductive extension portion is extended into the wearable body.

2. The wearable electronic device according to claim 1, wherein the circuit board is divided into a first part and a second part via a line passing through the first grounding portion and the second grounding portion, an area ratio of the first part to the second part is in a range of 1:5 to 1:1.

3. The wearable electronic device according to claim 2, wherein the first grounding portion and the second grounding portion are disposed on two adjacent edges of the circuit board, respectively.

4. The wearable electronic device according to claim 2, wherein the area ratio of the first part to the second part is 1:1.

5. The wearable electronic device according to claim 4, wherein the first grounding portion and the second grounding portion are disposed on two parallel edges of the circuit board, respectively.

6. The wearable electronic device according to claim 4, wherein the circuit board is in a circular shape, the first grounding portion and the second grounding portion are disposed on two ends of a diameter of the circuit board, respectively.

7. The wearable electronic device according to claim 1, wherein the antenna system includes a first section, a second section, a third section and a fourth section, the first section and the second section are parallel to each other and with equal length, two ends of the third second are respectively connected with an end of the first section and an end of the second section, an end of the fourth section is connected between two ends of the first section, and the other end of the fourth section is connected between two ends of the second section.

8. The wearable electronic device according to claim 7, wherein the antenna system is operating in a first frequency band and a second frequency band.

9. The wearable electronic device according to claim 1, wherein a material of the lower casing is a laser direct structuring material.

10. The wearable electronic device according to claim 9, wherein the antenna system is formed on the inner surface of the lower casing by laser direct structuring process.

* * * * *